(12) United States Patent
Avhad et al.

(10) Patent No.: US 12,299,396 B2
(45) Date of Patent: May 13, 2025

(54) METHOD AND SYSTEM FOR ANALYZING TEXTUAL NARRATIVES USING QUALITY CRITERIA

(71) Applicant: JPMorgan Chase Bank, N.A., New York, NY (US)

(72) Inventors: Yogesh Avhad, Mumbai (IN); Prashant P Shinde, Mumbai (IN); Reshmi Ali, Mumbai (IN); Gurkiran Arora, Mumbai (IN); Akshay Shantaram Jadhav, Mumbai (IN); Kenil Dinesh Shah, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 369 days.

(21) Appl. No.: 17/443,847

(22) Filed: Jul. 28, 2021

(65) Prior Publication Data

US 2022/0050969 A1 Feb. 17, 2022

Related U.S. Application Data

(60) Provisional application No. 63/065,707, filed on Aug. 14, 2020.

(51) Int. Cl.
| | |
|---|---|
| *G06F 40/30* | (2020.01) |
| *G06F 40/211* | (2020.01) |
| *G06F 40/226* | (2020.01) |
| *G06F 40/253* | (2020.01) |
| *G06F 40/289* | (2020.01) |

(52) U.S. Cl.
CPC .......... *G06F 40/30* (2020.01); *G06F 40/211* (2020.01); *G06F 40/226* (2020.01); *G06F 40/253* (2020.01); *G06F 40/289* (2020.01)

(58) Field of Classification Search
CPC ........ G06F 40/00; G06F 40/10; G06F 40/194; G06F 40/20–35
See application file for complete search history.

(56) References Cited

U.S. PATENT DOCUMENTS

| | | | |
|---|---|---|---|
| 11,113,175 B1 * | 9/2021 | Adamo | G06F 40/216 |
| 2020/0057632 A1 * | 2/2020 | Harsukhlal Sodha | G06N 3/044 |
| 2020/0265186 A1 * | 8/2020 | Donaldson | G06F 40/20 |
| 2021/0073064 A1 * | 3/2021 | Dobos | G06F 16/345 |

(Continued)

OTHER PUBLICATIONS

Atlassian, "Jira Overview", archived Aug. 8, 2020 (Year: 2020).*

(Continued)

*Primary Examiner* — Hai Phan
*Assistant Examiner* — Alexander Joongie Kim
(74) *Attorney, Agent, or Firm* — Greenblum & Bernstein, P.L.C.

(57) ABSTRACT

A system and method for analyzing a textual narrative are provided. The method includes: receiving, from a user, an input that includes a textual narrative; comparing the textual narrative to various types of quality criteria, including syntactical criteria, semantic criteria, and pragmatic criteria; determining, based on the comparison, whether the textual narrative satisfies the quality criteria; and providing an output that indicates a result of the determination. The textual narrative may be a JIRA user story or a JIRA epic. The comparison may be performed by using one or more Natural Language Processing techniques.

15 Claims, 16 Drawing Sheets

(56) References Cited

U.S. PATENT DOCUMENTS

2021/0141815 A1* 5/2021 Kochura ............... G06F 40/166
2021/0209421 A1* 7/2021 Liu ....................... G06F 18/253

OTHER PUBLICATIONS

Atlassian, "What is an epic?", archived Apr. 4, 2020 (Year: 2020).*
Atlassian, "Five Agile Metrics You Won't Hate", archived Mar. 7, 2020 (Year: 2020).*
Lucassen, Garm; Dalpiaz, Fabiano; Martijn E.M. van der Werf, Jan; Brinkkemper, Sjaak, "Forging High-Quality User Stories: Towards a Discipline for Agile Requirements", 2015, IEEE (Year: 2015).*

* cited by examiner

600

| Number | Description | Example Criterion Violated |
|---|---|---|
| Story-1 | I want to see a message when I complete the transaction. | Well-formed (the user base is missing) |
| Story-2 | As a User, I am able to click a checkout button and thereby perform a payment to complete my buying. | Atomic (as it clubs two requirements in one) |
| Story-3 | As a dentist, I want to see the appointments of this week (split into patients and visitors). See: Mockup—first create the overview screen—then add categorization. | Minimal (there is an additional mockup) |
| Story-4 | As a User, I want to open the buying page so that I can complete my payments. | Conceptually sound (the end is a referring to different requirement) |
| Story-5 | As a dentist, I want to add a discount to each patient, discount button on top right (never grayed out) | Problem-oriented (solution provided) |
| Story-6 | As a Seller, I am able to edit the section that I added to product profile. | Unambiguous (which section) |
| Story-7 | As a Seller, I am able to edit any product listings | Conflict-free (Story-7 refers to any product listing while Story-8 only to those that seller has added) |
| Story-8 | As a User, I am able to delete only the product listings that I added | |
| Story-9 | Machine configuration | Well-formed (requirement should be given in full sentence) |
| Story-10 | As a system admin, I want to see profiles so that I can edit them if anything is missing. | Estimatable (which profiles, User's or products?) |
| EPIC-1 | As a Seller, I am able to see a list items provided by other sellers, so that I stay up to date. | Uniqueness (Story-11 and EPIC-1 are the same) |
| Story-11 | As a Seller, I am able to see a list items provided by other sellers, so that I stay up to date. | |
| Story-12 | As an admin, I wish to receive an email notification when a new user is logged in. | Uniform (not aligned to template, no "able" in the means) |
| Story-13 | As an Administrator, I am able to add a new user to the system | Independent (one cannot view user's profile until its get added into the system) |
| Story-14 | As a visitor, I am able to view a user's profile | |

METHOD AND SYSTEM FOR ANALYZING TEXTUAL NARRATIVES USING QUALITY CRITERIA

CROSS-REFERENCE TO RELATED APPLICATIONS

This application claims the benefit of U.S. Provisional Patent Application Ser. No. 63/065,707, filed Aug. 14, 2020, which is hereby incorporated by reference in its entirety.

BACKGROUND

1. Field of the Disclosure

This technology generally relates to methods and systems for analyzing a textual narrative, and more particularly to methods and systems for analyzing a textual narrative to determine and report the quality thereof.

2. Background Information

Many modern day corporations, businesses, and organizations provide a means for employees or members to document textual narratives. These textual narratives may describe, e.g., an idea; a desired capability (for their users or customers); a new feature or product; an improvement to an existing feature or product; or an improvement to the corporation, business, or organization itself.

In many instances, the person or team who is responsible for drafting the textual narrative is different from the person or team responsible who is developing the idea, desired capability, new feature, new product, or improvement.

If the textual narrative is of poor quality, then the feature or product that is actually produced may not correspond to the idea, desired capability, new feature, new product, or improvement expected by the person or team who drafted the textual narrative. As a result, the corporation, business, or organization may waste time and money to communicate and change the idea, desired capability, new feature, new product, or improvement to correspond to that originally expected.

Such corporations, businesses, and organizations often lack a mechanism to prevent employees or members from inadvertently documenting substantially similar textual narratives or textual narratives of poor quality. As a result, the corporation, business, or organization may waste time and money consolidating or disposing of substantially similar textual narratives or mending issues caused by poor quality textual narratives thereby draining resources that could otherwise be used for more productive activities.

Accordingly, there is a need for a tool to assess the quality of textual narratives and to communicate possible improvements to textual narratives to the corresponding textual narrative creators.

SUMMARY

The present disclosure, through one or more of its various aspects, embodiments, and/or specific features or sub-components, provides, inter alia, various systems, servers, devices, methods, media, programs, and platforms for analyzing a textual narrative.

According to an aspect of the present disclosure, a method for analyzing a textual narrative is provided. The method is implemented by at least one processor. The method includes: receiving, from a user, an input that includes a textual narrative; comparing, by the at least one processor, the textual narrative to at least one quality criterion; determining, by the at least one processor based on the comparison, whether the textual narrative satisfies the list of quality criterion; and providing an output that indicates a result of the determination.

The target textual narrative may be a JIRA user story that relates to a feature of a software product and/or a JIRA epic that relates to a plurality of features of a software product.

In an exemplary embodiment, the comparison is performed by using a Natural Language Processing (NPL) technique.

The quality criterion may include a syntactical criterion that relates to a syntax of the textual narrative, a semantic criterion that relates to a conceptual soundness of the textual narrative, and/or a pragmatic criterion that relates to a subjective interpretation of the textual narrative to the audience.

The syntactical criterion may include a requirement that the textual narrative is well-formed, atomic, and/or minimal.

The semantic criterion may include a requirement that the textual narrative is conceptually sound, problem oriented, unambiguous, and/or in a full sentence.

The pragmatic criterion may include a requirement that the textual narrative is estimable, unique, conflict-free, uniform, independent, and/or complete.

The method may further include retrieving, by the at least one processor from a memory, another textual narrative; and comparing, by the at least one processor, the textual narrative to the another textual narrative, wherein when a result of the comparing of the textual narrative to the another textual narrative is that a match percentage exceeds a predetermined match percentage threshold, a determination is made that the requirement of being unique is violated.

The requirement of being problem oriented may include providing a description of a potential problem while avoiding prescribing a proposed solution to the potential problem.

According to an additional aspect of the present disclosure, a computing apparatus for analyzing a textual narrative is provided. The computing apparatus may include at least one processor, a memory, and a communication interface coupled to each processor and the memory. The processor may be configured to: receive, from a user, an input that includes a textual narrative; compare, by the at least one processor, the textual narrative to at least one quality criterion; determine, by the at least one processor based on the comparison, whether the textual narrative satisfies the list of quality criterion; and provide an output that indicates a result of the determination.

The target textual narrative may be a JIRA user story that relates to a feature of a software product and/or a JIRA epic that relates to a plurality of features of a software product.

In an exemplary embodiment, the comparison is performed by using a Natural Language Processing (NPL) technique.

The quality criterion may include a syntactical criterion that relates to a syntax of the textual narrative, a semantic criterion that relates to a conceptual soundness of the textual narrative, and a pragmatic criterion that relates to a subjective interpretation of the textual narrative to the audience.

The syntactical criterion may include a requirement that the textual narrative is well-formed, atomic, and/or minimal.

The semantic criterion may include a requirement that the textual narrative is conceptually sound, problem oriented, unambiguous, and/or in a full sentence.

The pragmatic criterion may include a requirement that the textual narrative is estimable, unique, conflict-free, uniform, independent, and/or complete.

The at least one processor of the computing apparatus may be further configured to retrieve another textual narrative from the memory, and compare the textual narrative to the another textual narrative, wherein when a result of the comparing of the textual narrative to the another textual narrative is that a match percentage exceeds a predetermined match percentage threshold, a determination is made that the requirement of being unique is violated.

The requirement of being problem oriented may include providing a description of a potential problem while avoiding prescribing a proposed solution to the potential problem.

According to yet another exemplary embodiment, a non-transitory computer readable storage medium may store instructions for analyzing a textual narrative. The storage medium may include executable code which, when executed by at least one processor, causes the at least one processor to: receive, by the at least one processor from a user, an input that includes the textual narrative; compare, by the at least one processor, the textual narrative to at least one quality criterion; determine, by the at least one processor based on the comparing, whether the textual narrative satisfies the at least one quality criterion; and provide an output that indicates a result of the determination.

The at least one quality criterion may include a syntactical criterion that relates to a syntax of the textual narrative, a semantic criterion that relates to a conceptual soundness of the textual narrative, and/or a pragmatic criterion that relates to a subjective interpretation of the textual narrative to an audience.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 shows a table of exemplary JIRA user stories and an exemplary JIRA epic and corresponding quality criteria violated by the exemplary user stories and epic, in accordance with an exemplary embodiment.

FIG. 11 shows an exemplary screenshot of a user interface relating to a project including textual narratives added thereto as well as their associated defects, explanations of the defects, and suggestions to mend the defects.

FIG. 12 shows an exemplary screenshot of a user interface relating to a textual narratives having multiple defects, explanations of the defects, and suggestions to mend the defects.

FIG. 13 shows an exemplary screenshot of a user interface relating to two textual narratives which both have a corresponding warning that the textual narrative(s) are not unique, an explanation of the warning, and a suggestion to address the warning.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
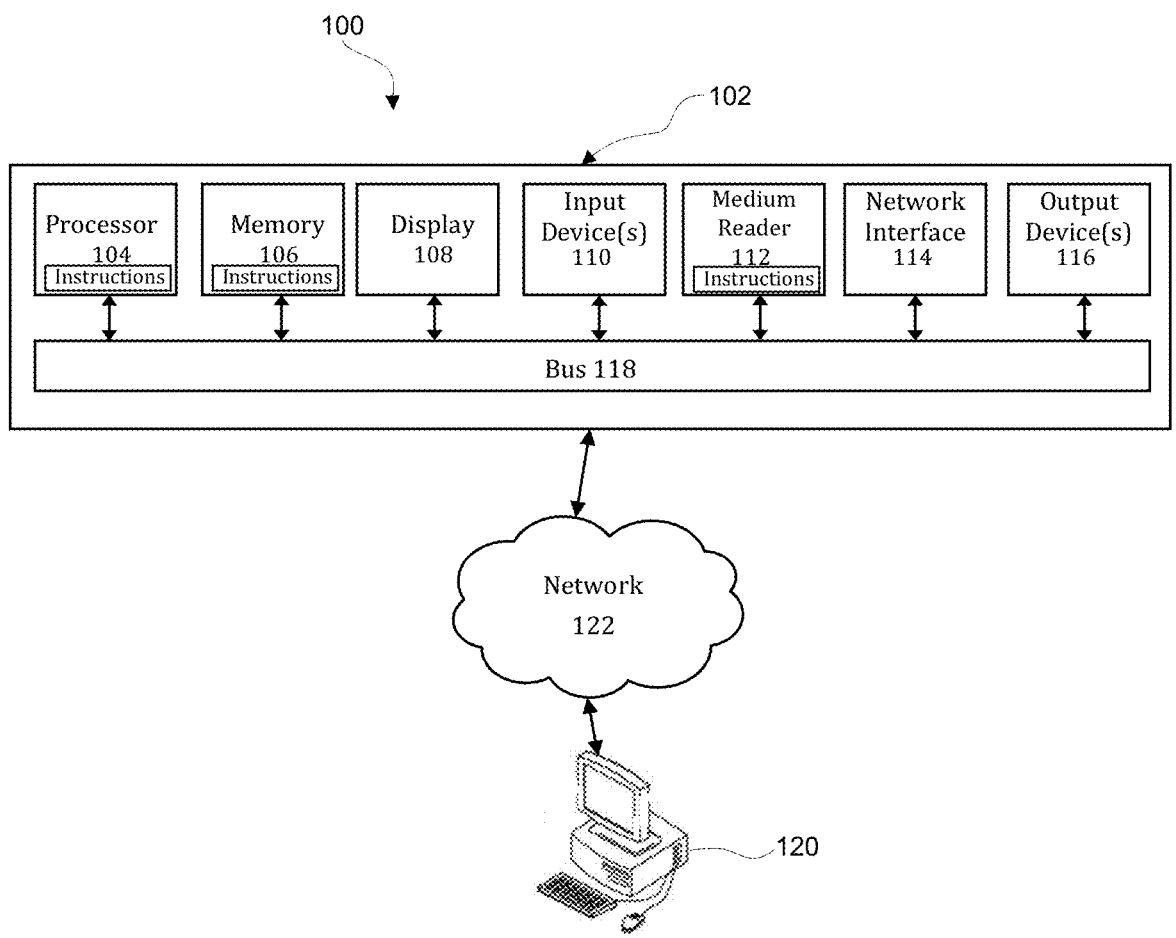
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for analyzing a textual narrative.

Figure 2:
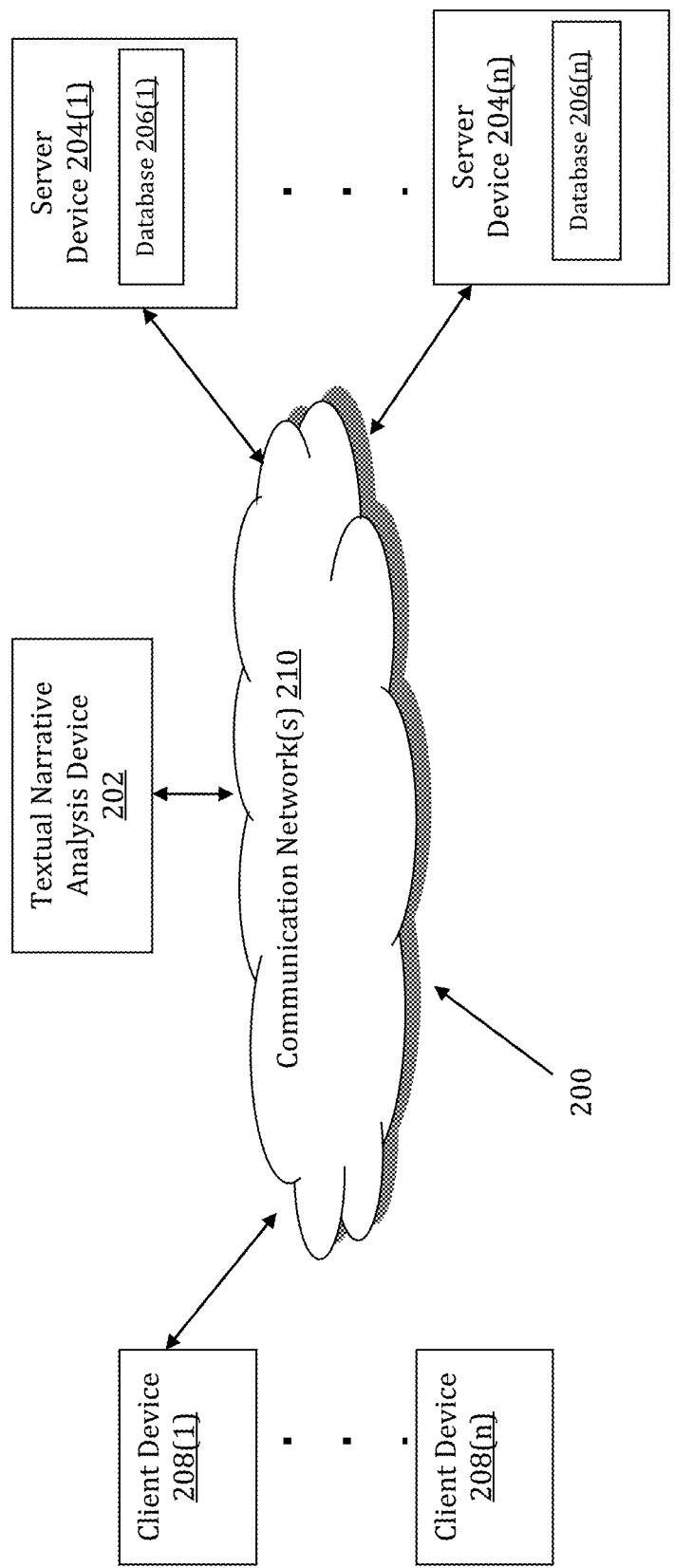
FIG. 2 illustrates an exemplary diagram of a network environment.

Referring to FIG. 2, a schematic of an exemplary network environment 200 for implementing a method for analyzing a textual narrative is illustrated. In an exemplary embodiment, the method is executable on any networked computer platform, such as, for example, a personal computer (PC).

The method for analyzing a textual narrative may be implemented by a Textual Narrative Analysis (TNA) device 202. The TNA device 202 may be the same or similar to the computer system 102 as described with respect to FIG. 1. The TNA device 202 may store one or more applications that can include executable instructions that, when executed by the TNA device 202, cause the TNA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TNA device 202 itself, may be located in virtual server(s) running in a cloud-based computing environment rather than being tied to one or more specific physical network computing devices. Also, the application(s) may be running in one or more virtual machines (VMs) executing on the TNA device 202. Additionally, in one or more embodiments of this technology, virtual machine(s) running on the TNA device 202 may be managed or supervised by a hypervisor.

In the network environment 200 of FIG. 2, the TNA device 202 is coupled to a plurality of server devices 204(1)-204(n) that hosts a plurality of databases 206(1)-206(n), and also to a plurality of client devices 208(1)-208(n) via communication network(s) 210. A communication interface of the TNA device 202, such as the network interface 114 of the computer system 102 of FIG. 1, operatively couples and communicates between the TNA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TNA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TNA devices that efficiently implement a method for analyzing a textual narrative.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TNA device 202 may be a standalone device or integrated with one or more other devices or apparatuses, such as one or more of the server devices 204(1)-204(n), for example. In one particular example, the TNA device 202 may include or be hosted by one of the server devices 204(1)-204(n), and other arrangements are also possible. Moreover, one or more of the devices of the TNA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TNA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store textual narrative data, quality criterion data, quality criterion satisfaction algorithm data, output information data, and data that relates to analyzing a textual narrative.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TNA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TNA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TNA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TNA device 202, the server devices 204(1)-204(n), or the client devices 208(1)-208(n), for example, may be configured to operate as virtual instances on the same physical machine. In other words, one or more of the TNA device 202, the server devices 204(1)-204(n), or the client devices 208(1)-208(n) may operate on the same physical device rather than as separate devices communicating through communication network(s) 210. Additionally, there may be more or fewer TNA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
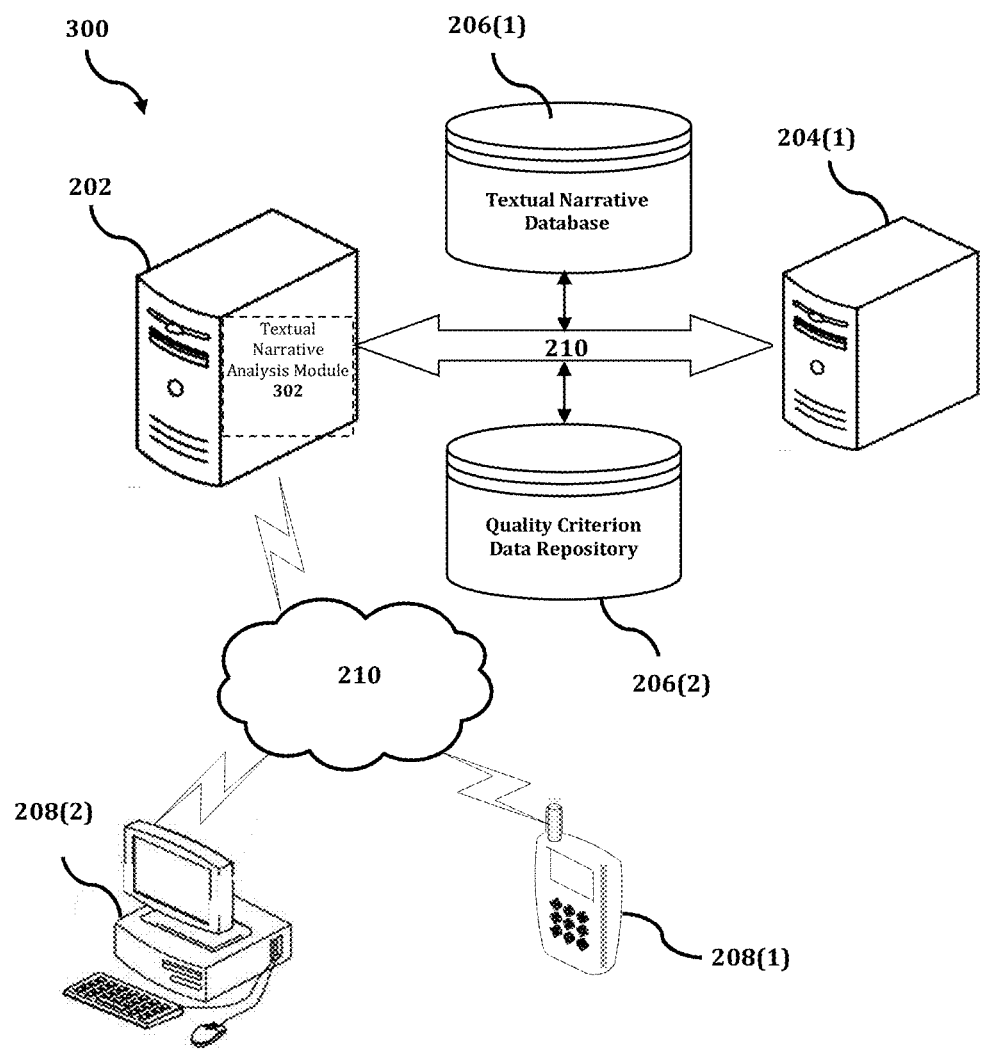
FIG. 3 shows an exemplary system for implementing a method for analyzing a textual narrative.

The TNA device 202 is described and shown in FIG. 3 as including a textual narrative analysis module 302, although it may include other rules, policies, modules, databases, or applications, for example. As will be described below, the textual narrative analysis module 302 is configured to implement a method for analyzing a textual narrative.

An exemplary process 300 for implementing a mechanism for analyzing a textual narrative by utilizing the network environment of FIG. 2 is shown as being executed in FIG. 3. Specifically, a first client device 208(1) and a second client device 208(2) are illustrated as being in communication with TNA device 202. In this regard, the first client device 208(1) and the second client device 208(2) may be "clients" of the TNA device 202 and are described herein as such. Nevertheless, it is to be known and understood that the first client device 208(1) and/or the second client device 208(2) need not necessarily be "clients" of the TNA device 202, or any entity described in association therewith herein. Any additional or alternative relationship may exist between either or both of the first client device 208(1) and the second client device 208(2) and the TNA device 202, or no relationship may exist. For example, the TNA device 202 and the first client device 208(1) may be configured as the same physical device.

Further, TNA device 202 is illustrated as being able to access a textual narrative database 206(1) and a quality criterion data repository 206(2). The textual narrative analysis module 302 may be configured to access these databases for implementing a method for analyzing a textual narrative.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TNA device 202 via broadband or cellular communication. Of course, these embodiments are merely exemplary and are not limiting or exhaustive.

Upon being started, the textual narrative analysis module 302 executes a process for analyzing a textual narrative. An exemplary process for analyzing a textual narrative is generally indicated at flowchart 400 in FIG. 4.

Figure 4:
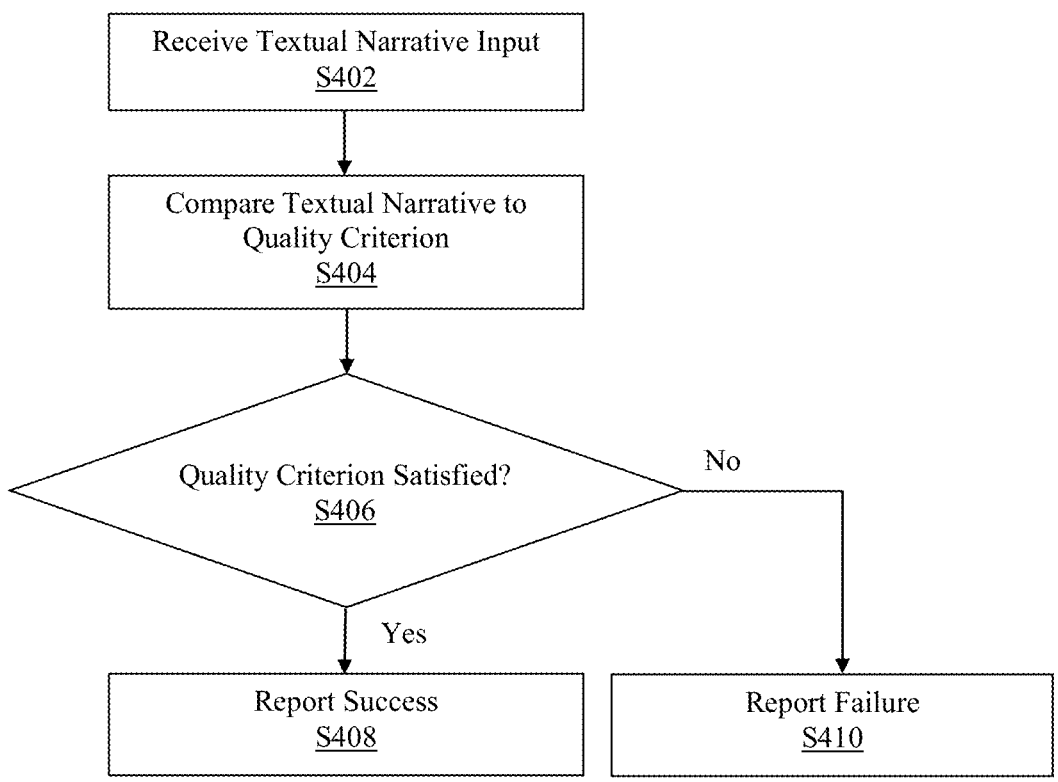
FIG. 4 is a flowchart of an exemplary process for implementing a method for analyzing a textual narrative.

In the process 400 of FIG. 4, at step S402, the textual narrative analysis module 302 obtains or receives an input that includes a textual narrative. In an exemplary embodiment, a textual narrative includes a JIRA user story that relates to a feature of a software product or a JIRA epic that may relate to a plurality of features of a software product. JIRA is a computer program that may be used to, inter alia, track, organize, and prioritize defects in, new features of, and improvements to software under development. A JIRA user story may be a short description that describes a feature's functionality from a user's point of view. The user may be, e.g., a customer or a user of a software product. A JIRA epic may have a format similar to a user story but typically has a broader scope. An epic is generally divided into a plurality of user stories, and a JIRA user story may relate to or be associated with a JIRA epic. A textual narrative database that may be used by a textual narrative analysis module 302 may include both JIRA user stories and JIRA epics.

At step S404, the textual narrative analysis module 302 compares the textual narrative received at step S402 to at least one quality criterion. A quality criterion may be, e.g., an indicator of a particular quality of the textual narrative. A quality criterion may be versatile in that it may be used to assess the quality of textual narratives in a variety of industries or markets. The quality criteria may include, for example, any one or more of syntactical criteria, semantic criteria, pragmatic criteria, and or any other type of criteria that are suitable for evaluating a particular aspect or quality of a textual narrative.

At step S406, a determination is made based on the comparison performed at step S404. In particular, the textual narrative analysis module 302 determines whether or not the quality criteria are satisfied. If the quality criteria are satisfied, the process proceeds to step S408, at which the textual narrative analyzing module 302 indicates to the user, e.g., via a display, that the quality criteria have been satisfied.

If the quality criteria are not satisfied, the process proceeds to step S410, at which the textual narrative analyzing module 302 may indicate to the user, e.g., via a display, which of the quality criterion have not been satisfied. The textual narrative analyzing module 302 may further indicate suggested improvements that may provide suggested corrections to the textual narrative in order to satisfy a failed quality criterion. In this aspect, the textual narrative analysis module 302 provides a means for the user to edit or correct the textual narrative, thus giving the user an opportunity to satisfy one or more failed criteria.

In an exemplary embodiment, the textual narrative analysis module 302 may also store and/or report the successes or failures with respect to a plurality of textual narratives. The textual narrative analysis module 302 may, e.g., provide a means to access or transmit quality criteria results of a plurality of textual narratives ("data analytics").

The data analytics may be made available to or transmitted to particular employees or members, e.g., leaders, of a business, corporation, or organization, in order to provide visibility of the quality of textual narratives on a macroscopic scale. The data analytics may be organized or presented in a variety of ways (e.g., by department, team, or location), and the way in which the data analytics are organized or presented may be chosen by the person to which they are presented.

In an exemplary embodiment, there are a plurality of quality criteria, and each quality criterion of the plurality of quality criteria may belong to at least one category. Exemplary categories may include, e.g., a syntactical criterion that relates to a syntax of the textual narrative, a semantic criterion that relates to a conceptual soundness of the textual narrative, a pragmatic criterion that relates to a subjective interpretation of the textual narrative to the audience. The audience may be a person or team that is responsible for creating a feature or product based on the textual narrative.

The syntactical criteria may include, e.g., any one or more requirements that the textual narrative is well-formed, atomic, and/or minimal. In another exemplary embodiment, the syntactical criteria may include, e.g., any one or more of a word choice criterion, a word order criterion, a criterion that relates to the number of conjunctions, and a criterion that relates to matching a number with a verb tense.

The "well-formed" syntactical criterion may include satisfying a condition that the textual narrative includes at least an actor, also known as a role, and an expected functionality, also known as a means. In an alternative embodiment, the "well-formed" syntactical criterion may further require the textual narrative include, in addition to an actor (role) and an expected functionality (means), a reason for the expected functionality, also known as an end. A textual narrative that includes a role, a means, and an end may provide the person or team responsible for creating or developing the feature or product described by the textual narrative with information that (1) may describe a user or customer who may use or benefit from the feature or product, (2) may describe how the user or customer is to use or benefit from the feature or product, and (3) may describe the purpose of the feature or product, i.e., why the user or customer may use or benefit from the feature or product described by the textual narrative. Such information may improve the feature or product that is ultimately created using the textual narrative because such information provides clear objectives for the person or team responsible for creating or developing the feature or product described by the textual narrative.

The "atomic" syntactical criterion may require the textual narrative to be specific to a single feature, product, or requirement. A requirement that a textual narrative is specific to a single feature, product, or requirement may enable the person or team responsible for creating or developing the feature or product described by the textual narrative to focus on and to easily manage tasks to create the single feature, product, or requirement.

The "minimal" syntactical criterion may require a textual narrative to contain only essential components such as a role and a means. In an alternative embodiment, the "minimal" syntactical criterion may require a textual narrative to contain only a role, a means, and an end. In this regard, the "minimal" criterion may ensure that a textual narrative does not include additional and/or unnecessary language that may cause confusion.

In an exemplary embodiment, a high-quality textual narrative related to a business requirement may include syntactical characteristics. For example, the textual narrative may include for whom the requirement to be built, i.e., the actor; what the requirement that is to be built, i.e., the means; and why the requirement is to be built, i.e., the end. The comparison performed by the textual narrative analysis module 302 may be implemented by scanning a received textual narrative and comparing the scanned textual narrative with a database of syntactical characteristics. The textual narrative analysis module 302 may then make a determination of whether the scanned textual narrative includes the syntactical characteristics. The textual narrative analysis module 302 may then output a result of the determination by, e.g., notifying the user of which of the syntactical characteristics have been determined as not included in the scanned textual narrative.

In an exemplary embodiment, textual narratives in the form of JIRA user stories may serve as milestones for a software development team, to be completed in a relatively short time period. A unit of time in which JIRA user stories may be completed may be referred to as a sprint, and the duration of a sprint may be, e.g., one or two weeks. A leader of a software development team may assign software developer(s) a task to develop, within a predetermined number of sprints, a feature related to a JIRA user story. In this regard, it may be advantageous for a textual narrative, i.e., a JIRA user story, to relate to only one feature (thus satisfying the "atomic" syntactical criterion). Further, in order to manage the workload of, e.g., a software development team, it may be advantageous for the JIRA user story to contain only one feature.

The textual narrative analysis module 302 may scan a received textual narrative, parse the words contained within the textual narrative, and compare the words to a database of conjunctions. If the textual narrative analysis module 302 determines, based on the comparison, that the textual narrative includes a number of conjunctions exceeding a predetermined number of conjunctions, the Textual Narrative Analyzing module 302 may determine that a criterion that relates to the number of conjunctions has failed and may indicate the same to the user.

The semantic criterion may include a requirement that the textual narrative is conceptually sound, problem oriented, unambiguous, and/or in a full sentence.

The "conceptually sound" semantic criterion may require that the textual narrative includes a rationalization of the means which the textual narrative aims to achieve. The "problem-oriented" semantic criterion may require the textual narrative to be limited to language which addresses a particular problem. The "unambiguous" semantic criterion may require a textual narrative be substantially distinct as compared to other textual narratives, which may be stored, e.g., in a textual narrative database. In an exemplary embodiment, the textual narrative database includes a plurality of textual narratives which relate to a particular project in an organization. The "full sentence" semantic criterion may require a textual narrative to be in a complete sentence, may require all of the words in the textual narrative to be spelled correctly, and/or may require the textual narrative to lack grammatical errors. In an alternative embodiment, the "full sentence" semantic criterion may require a textual narrative to include less than a predetermined number of misspelled words and/or grammatical errors. A semantic criterion may be used, for example, to warn the user of grammatical errors in a textual narrative that may cause an employee or member to misunderstand the textual narrative.

The unambiguous criterion, e.g., may be used to warn of inadvertent creation of multiple textual narratives that have substantially similar descriptions, which may cause confusion, may take valuable time of employees or member to consolidate, and may result in wasted resources if two substantially similar features or products are created.

The textual narrative analyzing module 302 may implement the unambiguous criterion by comparing the contents of a received textual narrative to contents of textual narratives that have been previously created by the business, corporation, or organization. In an exemplary embodiment, the comparison includes ascertaining a percentage similarity between the received textual narrative and one or more previously created textual narratives. If the textual narrative analyzing module 302 determines that the percentage similarity (between the received textual narrative and one or more previously created textual narratives) exceeds a predetermined percentage similarity, then the textual narrative analyzing module 302 may determine that the unambiguous criterion has failed and may indicate the same to the user.

An ambiguousness criterion, e.g., may be used to warn of a textual narrative that may be unclear. A textual narrative may be unclear if the textual narrative includes particular words that have a large number of meanings or definitions. The textual narrative analysis module 302 may implement the ambiguousness criterion by comparing a received textual narrative to a database of ambiguous words. If the textual narrative analysis module 302 determines that the textual narrative includes a number of ambiguous words exceeding a predetermined number of ambiguous words, then the textual narrative analysis module 302 may determine that the ambiguousness criterion has failed and may indicate the same to the user. The pragmatic criterion may include a requirement that the textual narrative is estimable, unique, conflict-free, uniform, independent, and/or complete. The "estimable" pragmatic criterion may require that a textual narrative is sufficiently limited, e.g., in length or scope, such that members of the organization may effectively estimate a time frame required to create a feature or product described by the textual narrative. The "unique" pragmatic criterion may require that a textual narrative is semantically unique in nature.

A "conflict-free" pragmatic criterion may require that a textual narrative does not conflict with any of the other user stories in the project. A "uniform" pragmatic criterion may require that a textual narrative conforms to a predetermined format, which may be consistent across a majority of textual narratives stored in the textual narrative database. An "independent" pragmatic criterion may require that a textual narrative is independent of other stories such that member(s) of the organization who are working to create the feature or product described the textual narrative may deliver the same irrespective of timeline(s) of other member(s). A "complete" pragmatic criterion may require that a textual narrative is a part of a logical group of textual narratives and/or includes unique feature(s).

Figure 5:
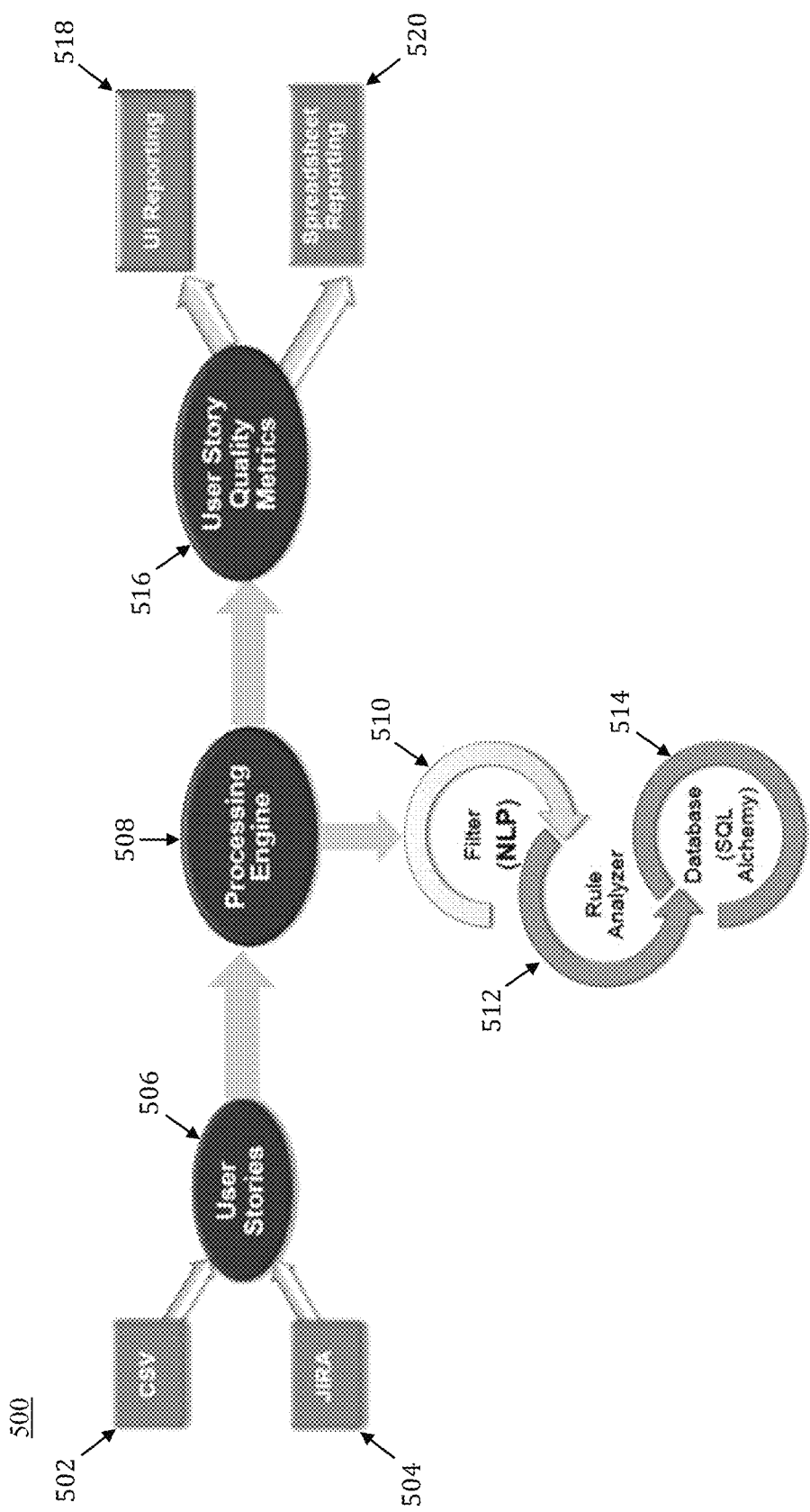
FIG. 5 shows a diagram that illustrates a sequence of data flows during a textual narrative analyzing process, in accordance with an exemplary embodiment.

Referring to FIG. 5, a diagram 500 that illustrates a sequence of data flows during a textual narrative analyzing process, according to an exemplary embodiment, is shown. The textual narrative analysis module 302 may receive or obtain one or more user stories 506 from a Comma-Separated Value (CSV) file 502, which may be a plain text file that may store table(s) and/or spreadsheet information. The textual narrative analysis module 302 may receive or obtain one or more user stories 506 from JIRA 504. In an alternative, the textual narrative analysis module 302 may receive or obtain user stories 506 from both CSV 502 and JIRA 504.

As illustrated in FIG. 5, the user stories 506 may be transmitted to a processing engine 508. In an exemplary embodiment, the processing engine 508 may be implemented as TNA device 202 and configured to execute the textual narrative analysis module 302. The processing engine 508 may transmit the received user stories 506 through a filter 510, which may analyze the user stories by using Natural Processing Language (NPL) techniques. The NPL techniques may scan the received user stories to parse, classify, tag, stem, and/or tokenize the text of the user stories. The NPL technique may use, e.g., any one or more of libraries, programs, Artificial Intelligence (AI), or a combination thereof. The NPL technique may analyze a sequence of characters of the user stories to recognize words within the user stories and/or relate a meaning to the words.

The filter 510 may transfer the user stories to a rule analyzer 512. The rule analyzer 512 may include rules that relate to quality criteria. The rule analyzer 512 may compare the user stories to the quality criteria and may determine, based on the rules that relate to the quality criteria, whether or not a particular user story satisfies a particular quality criterion. The rule analyzer 512 may then transfer the results of the rule analysis to a database 514. The database 514 may be a Structured Query Language (SQL) database. The database 514 may be accessible by, e.g., an object-relational mapping tool such as SQL Alchemy.

The processing engine 508 may transfer data relating to at least one of the filter 510, the rule analyzer 512, and the database 514 to a user story quality metrics component 516. The user story quality metrics component 516 may report the results of the processing engine 508 (i.e., the results of at least one of the filter 510, the rule analyzer 512, and the database 514) to one or both of a User Interface (UI) reporting component 518 or a reporting spreadsheet 520.

The textual narrative analysis module 302 may be integrated with JIRA such that a user may analyze textual narratives within the JIRA application. The textual narrative analysis module 302 may have Single Sign On (SSO) capabilities, and a user may be able to analyze textual narratives by logging or signing on to an application for which the user already has valid credentials. In an alternative embodiment, the textual narrative analysis module 302 may be implemented as a computer application that is executed separately from JIRA.

The computer application, which may be connected or disconnected to JIRA, may have a Graphical User Interface (GUI), which may be used, inter alia, to input a textual narrative and/or to output quality criteria results.

Referring to FIG. 6, a table 600 of exemplary JIRA user stories and an exemplary JIRA epic which may be input to the textual narrative analysis module 302 and corresponding quality criteria violated by the exemplary user stories and epic is provided. In particular, table 600 has three columns, namely, a number column, a description column, and an example criterion violated column. The number column provides a reference number for a story or epic; the description column includes the language of the user story or epic; and the violated criterion/criteria column includes an identification and a short description of at least one violated criterion of the corresponding user story or epic in the same row. The violated criterion corresponding to each user story or epic may not be the only violated criterion. Each violated criterion noted in table 600 is for exemplary purposes, and each user story or epic in table 600 may violate additional criteria that are not identified in table 600.

Story-1, for example, reads "I want to see a message when I complete the transaction," which violates the quality criteria "well-formed" because the noun "I" does not sufficiently describe the actor. The person or team that is responsible for creating a feature or product based on Story-1 may be unable to determine who "wants to see a message." Ambiguity of the noun "I" is apparent when considering that the noun "I" could refer to, e.g., either a buyer or a seller. As such, it may be unclear to a software developer for whom the feature should be created.

Story-2 reads "As a user, I am able to click a checkout button and thereby perform a payment to complete my buying," which violates the "atomic" quality criterion because Story-2 includes two distinct features. That is, Story-2 includes a first feature of an ability to click a checkout button and a distinct second feature of an ability to perform a payment to complete the user's buying.

Story-3 reads "As a dentist, I want to see the appointments of this week (split into patients and visitors). See: Mockup— first create the overview screen—then add categorization," and violates the "minimal" criterion because Story-3 includes more than only essential components such as a role and a means. In Story-3, the role is dentist, and the means is wanting to see the appointments of this week categorized by patients and visitors. The additional language is "See: Mockup—first create the overview screen—then add categorization," which adds undue complexity.

Story-4 reads "As a User, I want to open the buying page so that I can complete my payments" and violates the "conceptually sound" criterion because the "end," i.e., the purpose of the story, refers to completing a payment instead of opening a buying page.

Story-5 reads "As a dentist, I want to add a discount to each patient discount button on top right (never grayed out)" and violates the "problem-oriented" criterion because this story includes a solution to the problem for which this story was created. In particular, never graying out a discount button may be interpreted as a solution to the problem of wanting a way to add a discount to each patient discount button. There may be other viable solutions to such problem, and the "problem-oriented" criterion may enable the person or team responsible creative freedom in addressing the problem and coming up with a solution.

Story-6 reads "As a Seller, I am able to edit the section that I added to product profile" and violates the "unambiguous" criterion because it is unclear which section is being added to the product profile, and thus it is unclear which section should be edited.

Story-7 reads "As a Seller, I am able to edit any product listings," and Story-8 reads "As a User, I am able to delete only the product listings that I added." Story-7 and Story-8 violate the "conflict-free" criterion because Story-7 refers to any product listing and Story-8 refers to a product listing that a user has added. Since (a) the functionality of deleting is a subset of the functionality of editing and (b) product listings that a user has added is a subset of any product listing, Story-7 conflicts with Story-8. If two different people or teams independently develop Story-7 and Story-8, there may be wasted resources because work performed to create a feature that corresponds to Story-7 may be substantially similar to work performed to create a feature that corresponds to Story-8.

Story-9 reads "Machine configuration" and violates at least the "well-formed" criterion because Story-9 lacks an actor and an expected functionality. Story-9 fails to pass the "well-formed" criterion at least since a person or team reading Story-9, which is an incomplete sentence, may be uncertain as to the feature or product corresponding to Story-9 that is expected by the person or team who drafted Story-9.

Story-10 reads "As a system admin, I want to see profiles so that I can edit them if anything is missing" and may violate the "estimatable" criterion at least because Story 10 does not specify which profiles should be edited. A person or team responsible for creating a feature that corresponds to Story-10 may be uncertain as to whether the person or team that drafted Story-10 refers to profiles of buyers, profiles of sellers, or both. Without Story-10 specifying which profiles should be edited, a person or team responsible for creating a feature or product corresponding to Story-10 may be unable to determine how much time it may take to create such a feature or product.

EPIC-1 and Story-11 both read "As a Seller, I am able to see a list items provided by the other sellers, so that I stay up to date," and both violate the "uniqueness" criterion since they are identical textual narratives. In an exemplary embodiment, a textual narrative (e.g., a user story or epic) is compared to a textual narrative database including previously created textual narratives, and only the subsequently created textual narratives which are identical to or substantially similar to an a textual narrative existing in the database violates the "uniqueness" criterion, and the identical or substantially similar existing textual narrative existing in the database does not violate the "uniqueness" criterion.

Story-12 reads "As an admin, I wish to receive an email notification when a new user is logged in" and violates the "uniform" criterion because Story-12 fails to include the phrase "able to" and thus does not follow a predetermined textual narrative convention. One goal of creating a feature corresponding to a textual narrative may be to realize the functionality described by the textual narrative. Since the word "want" may be subjective, it may be unclear what features may induce a user to "want to" do or perform a function. Conversely, since "able" may relate to an objective, physical, and tangible ability, a person or team responsible for creating the feature corresponding to the textual narrative may determine with more certainty which features may be implemented to realize the functionality described by the textual narrative.

Story-13 reads "As an administrator, I am able to add a new user to the system," and Story-14 reads "As a visitor, I am able to view a user's profile." Story-13 and Story-14 violate the "independent" criterion because the Story-14 depends on Story-13. In particular, a visitor would not be able to view a user's profile until the user is in the system, and until an administrator is able to add new users to the system, the user would not be in the system. Therefore, member(s) of the organization who are working to create the feature corresponding to Story-14 may be unable to deliver the feature corresponding to Story-14 until the member(s) of the organization who are working on the feature corresponding to Story-13 have completed the feature corresponding to Story-13. Therefore, Story-13 and Story-14 are not independent of one another.

Figure 7:
FIG. 7 shows a screenshot of a user interface (UI) providing accessible information regarding quality criterion for an exemplary embodiment is shown.

Referring to FIG. 7, a screenshot of a user interface (UI) 700 for an exemplary embodiment is shown. The user interface may be accessible via an Internet browser and/or accessible via an application that may be downloaded and/or installed on a computer.

The UI 700 may include a title 702 such as "Story Transformation and Rectification Tool" or "S.T.A.R.T." and may display a plurality of links and/or icons such home 704, information 706, new project 708, projects 710, contact us 712, and logout 714. The information link/icon 706 may include text that relates to the title. As shown in FIG. 7, information link/icon 706 includes the text "About S.T.A.R.T." A user may access the UI shown in FIG. 7 by clicking a home icon/link 704 or the information icon/link 706. The home 704, information 706, new project 708, projects 710, contact us 712, and logout 714 links/icons may remain accessible even upon navigating away from the UI page shown in FIG. 7.

The UI 700 may include a list of quality criteria, e.g., well-formed 716, minimal 718, atomic 720, unique 722, problem-oriented 724, and conflict free 726. In an exemplary embodiment, a user may be able to click on one of the listed quality criteria, and upon clicking on a quality criterion, may provide information about the clicked quality criterion.

The quality criterion of being unique 722 may include a requirement that a textual narrative, such as a JIRA user story or a JIRA epic, be unique or without duplicity. The existence of two or more textual narratives that are duplicative or not unique may cause inefficiencies such as, for example, wasting the time of a software development team. The software development team may have to individually and manually search for, find, and consolidate or delete duplicative textual narratives, which is a time consuming process.

The rule or quality criterion of being unique 722 may identify duplicative textual narratives. In an exemplary embodiment, the language used in each textual narrative is compared with other textual narratives. In an exemplary embodiment, a textual narrative input by a user is compared to a textual narrative that is retrieved from a memory. At least one of the processing engine 508, TNA device 202, and textual narrative analysis module 302 may compare two textual narratives. If a result of this comparison of the two textual narratives is that a match percentage exceeds a predetermined match percentage threshold, a determination may be made that the requirement of being unique has been violated.

For example, if it is determined that there is more than 90% of a match between a first textual narrative and a second textual narrative, the first textual narrative and the second textual narrative may be identified as "not Unique."

The rule or quality criterion of being problem oriented 724 requires that textual narratives, such as JIRA user stories and/or JIRA epics, include requirements that are problem oriented and not solution oriented. That is the requirement of being problem oriented 724 includes providing a description of a potential problem while avoiding prescribing a proposed solution to the potential problem. Prescribing solutions in textual narratives may limit the liberty and imagination of the software development team. Prescribing solutions in textual narratives further disables the software development team from making suggestions to achieve the functionality of the feature, e.g., in a more efficient, alternative, or otherwise better way.

In an exemplary embodiment, a first textual narrative and a second textual narrative may be JIRA User Story 1 and JIRA User Story 2 below:

User Story 1: Users of an online website should be notified when their passwords are about to expire.

User Story 2: Users of an online website should get an email stating "Your password is about to expire," which should be sent over a Simple Mail Transfer Protocol (SMTP) server.

At least one of the processing engine 508, TNA device 202, and textual narrative analysis module 302 may analyze the language of the textual narrative and make a determination regarding whether the textual narrative is problem oriented. Such determination may use any one or more of NPL techniques, libraries, programs, AI, and Machine Learning (ML).

In this exemplary embodiment, the processing engine 508, TNA device 202, and/or textual narrative analysis module 302 would make a determination that JIRA User Story 1 is problem oriented because JIRA User Story 1 does not place limits on the language of the notification, the means by which the notification should be delivered, etc. The language of User Story 1 may enable a software development team to make a suggestion such as, e.g., sending a notification over an email, SMS, presenting the notification on a banner on a website. The processing engine 508, TNA device 202, and/or textual narrative analysis module 302 would thus determine that JIRA User Story 1 does not violate the rule or quality criterion of being problem oriented 724.

Conversely, in this embodiment, the processing engine 508, TNA device 202, and/or textual narrative analysis module 302 would make a determination that JIRA User Story 2 is solution oriented because, e.g., JIRA User Story 2 imposes restrictions on the language of the notification and the means by which the notification should be delivered. As compared to the language of JIRA User Story 1, the language of JIRA User Story 2 offers less opportunity for a software development team to create alternative language or alternative methods of delivering the notification. The processing engine 508, TNA device 202, and/or textual narrative analysis module 302 would thus determine that JIRA User Story 2 violates the rule or quality criterion of being problem oriented 724.

The rule or quality criterion of being conflict free 726 requires that textual narratives should not conflict with one another. When textual narratives, such as JIRA user stories and/or JIRA epics, do not conflict with another, a software development team is better equipped to develop robust software that does not include discrepancies in the features of the software created by the software development team.

In an exemplary embodiment, a first textual narrative and a second textual narrative may be JIRA User Story 3 and JIRA User Story 4 below:

JIRA User Story 3: An e-commerce shopping website should not allow customers to order more than 5 quantity of the same item.

JIRA User Story 4: An e-commerce shopping website should not impose any quantity restriction on the customers who want to buy an item in bulk.

At least one of the processing engine 508, TNA device 202, and textual narrative analysis module 302 may compare user story 3 and user story 4. In this exemplary embodiment, the processing engine 508, TNA device 202, and/or textual narrative analysis module 302 would make a determination that user story 3 conflicts with user story 4 because the requirement in user story 3 of disallowing customers to order more than 5 quantities of the same item conflicts with the requirement in user story 4 of not imposing any quantity restrictions on customers who want to buy an item in bulk.

In an exemplary embodiment, a textual narrative input by a user may be compared with one or more textual narratives stored in memory, and if a determination is made that the textual narrative input by the user conflicts with one or more textual narratives stored in memory, the UI 700 may display the detected conflict(s).

Figure 8:
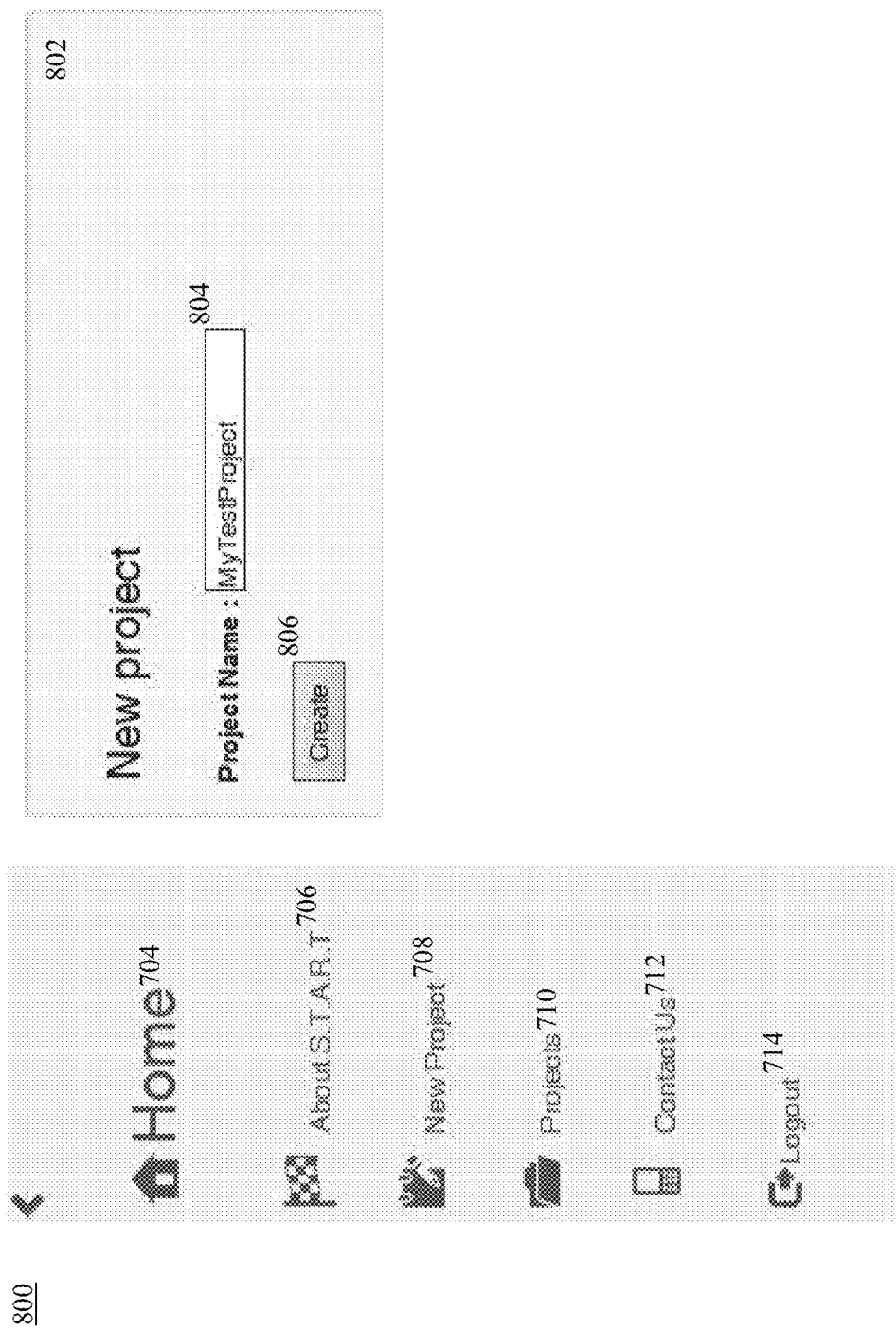
FIG. 8 shows an exemplary screenshot of a user interface for creating a new project.

Referring to FIG. 8, an exemplary screenshot of a UI 800 for creating a new S.T.A.R.T. project is shown. The UI of FIG. 8 may appear upon a user clicking the new project 708 link/icon shown in FIG. 7. The UI 800 may include a new S.T.A.R.T. project creation section 802 that may include a new S.T.A.R.T. project name field 804 and a create S.T.A.R.T. project button 806. A user may use the new S.T.A.R.T. project creation section 802 to create a new S.T.A.R.T. project by inserting a S.T.A.R.T. project name into the new S.T.A.R.T. project name field 804 and clicking the create S.T.A.R.T. project button 806.

Figure 9:
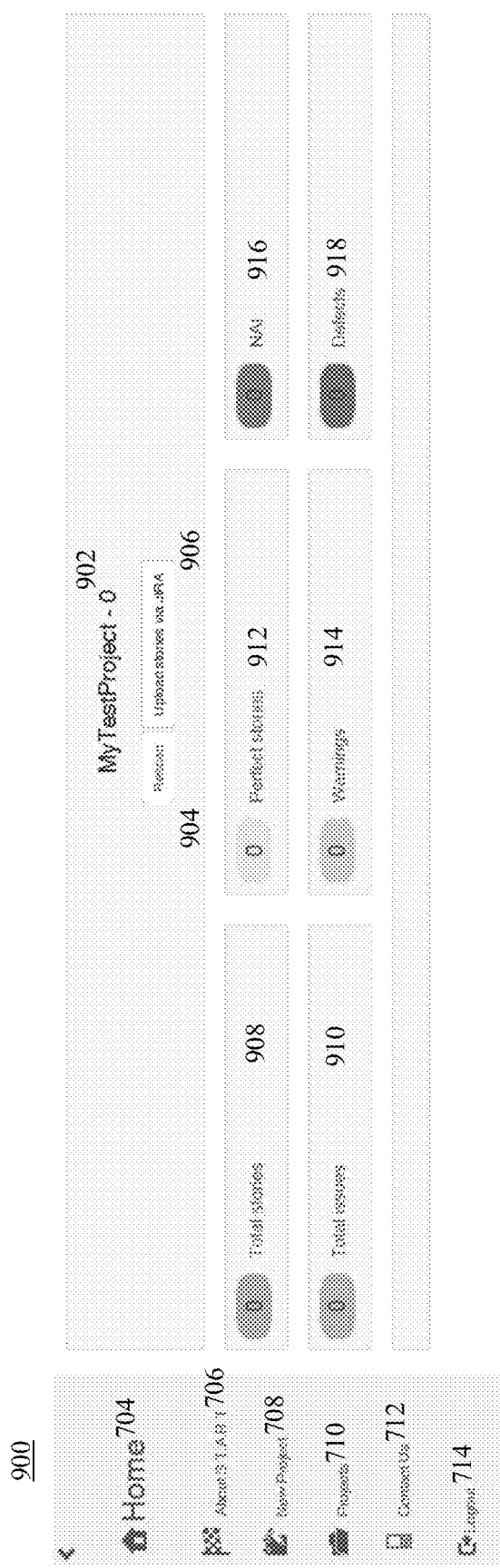
FIG. 9 shows an exemplary screenshot of a user interface relating to a created new project that does not yet have textual narratives added.

Referring to FIG. 9, an exemplary screenshot of a UI 900 relating to a created new S.T.A.R.T. project that does not yet have textual narratives added is shown. In an exemplary embodiment, UI 900 is a screenshot of a display presented to the user after the user has created a project. The UI 900 may include a S.T.A.R.T. project title 902 which may substantially correspond to the S.T.A.R.T. project name that may have been previously entered into the S.T.A.R.T. project name field 804. The UI 900 may include a Rescan button 904 and may include an Upload stories via JIRA button 906.

If there are no stories uploaded or added to the S.T.A.R.T. project, the user may not have an option to click the Rescan button 904. For example, the Rescan button 904 may be grayed out or may not be displayed to the user.

The UI 900 may include a Total stories section 908, a Total issues section 910, a Perfect stories section 912, a Warnings section 914, a Defects section 918, and a Not An Issue (NAI) section 916 that respectively indicate how many total stories, total issues, perfect stories, warnings, defects, and NAIs are included in the S.T.A.R.T. project. Since UI 900 does not yet have any stories, epics, or textual narratives uploaded, each of the Total stories section 908, Total issues section 910, Perfect stories section 912, Warnings section 914, Defects section 918, and NAI section 916 indicates the number zero. A user may use the Upload stories via JIRA button 906 to upload stories via JIRA to a created S.T.A.R.T. project. While uploading stories via JIRA may be one possible way to add textual narratives to a S.T.A.R.T. project, there may be alternative or additional ways to upload textual narratives to the S.T.A.R.T. project. For example, the UI 900 may be configured to upload a Comma-Separated Value (CSV) file that includes a plurality of textual narratives, including but not limited to JIRA user stories and/or JIRA epics. In addition to or instead of adding stories via JIRA, the UI 900 may have a textual narrative field in which a user may insert a textual narrative by typing the textual narrative into the textual narrative field.

Figure 10:
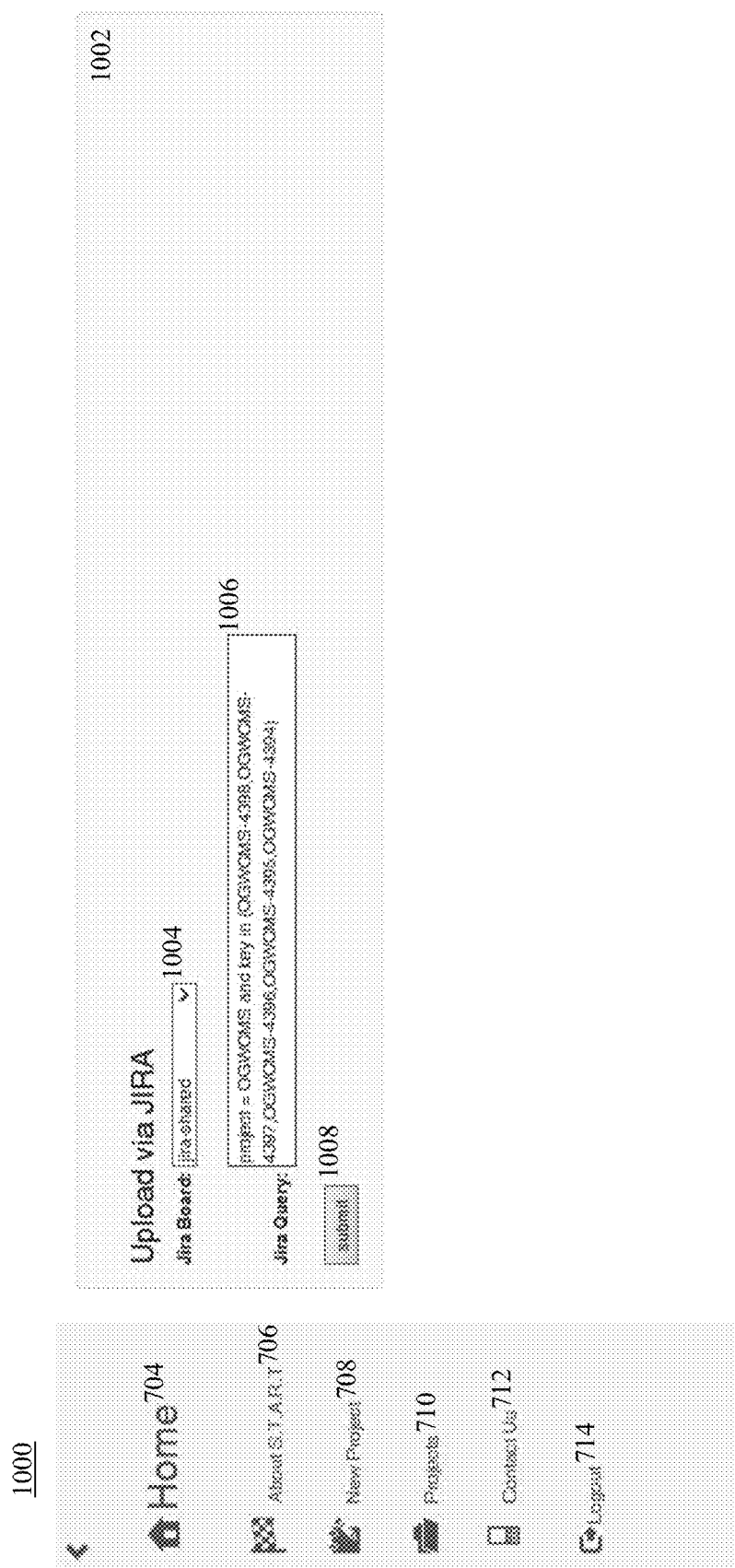
FIG. 10 shows an exemplary screenshot of a user interface for uploading textual narratives via JIRA.

Referring to FIG. 10, an exemplary screenshot of a UI 1000 for uploading textual narratives to a S.T.A.R.T. project is shown. In an exemplary embodiment, the textual narrative may be a JIRA user story or a JIRA epic, and the textual narrative may be uploaded in an Upload via JIRA section 1002 of the UI 1000. The Upload via JIRA section 1002 may include a Jira Board field 1004. A Jira Board is a tool used in Jira to display and organize a plurality of issues and provides a way to view, manage, and report on work in progress. A JIRA project may include a plurality of boards.

A user may chose a Jira Board by clicking on a dropdown menu to expand the dropdown menu and clicking an option for a Jira Board from among the options presented by the expanded dropdown menu. Also, a user may chose a Jira Board by typing a name of a Jira Board into the Jira Board field 1004. As shown in FIG. 10, the Jira Board having a name of "jira-shared" has been either selected from a dropdown or entered into the Jira Board field 1004.

The Upload via JIRA section 1002 may include a Jira Query field 1006. A user may specify which user stories to be uploaded to the S.T.A.R.T. project by identifying the user stories in the Jira Query field 1006. In an exemplary embodiment, there may be a particular convention that is used for information entered into the Jira Query field 1006. After a user enters information into the Jira Board field 1004 and Jira Query field 1006, a user may click a submit button 1008 to add textual narratives specified in the Jira Board field 1004 and Jira Query field 1006 to a S.T.A.R.T. project.

As shown in FIG. 10, the following has been entered into the Jira Query field 1006: "project=OGWCMS and key in (OGWCMS-4398,OGWCMS-4397, OGWCMS-4396, OGWCMS-4395,OGWCMS-4394)." The above noted exemplary input to the Jira Query field 1006 may result in adding user stories having alphanumeric identifiers "OGWCMS-4398," "OGWCMS-4397," "OGWCMS-4396," "OGWCMS-4395," and "OGWCMS-4394," which all may belong to a JIRA project titled "OGWCMS," to the S.T.A.R.T. project when a user clicks the submit button 1008.

Figure 11:
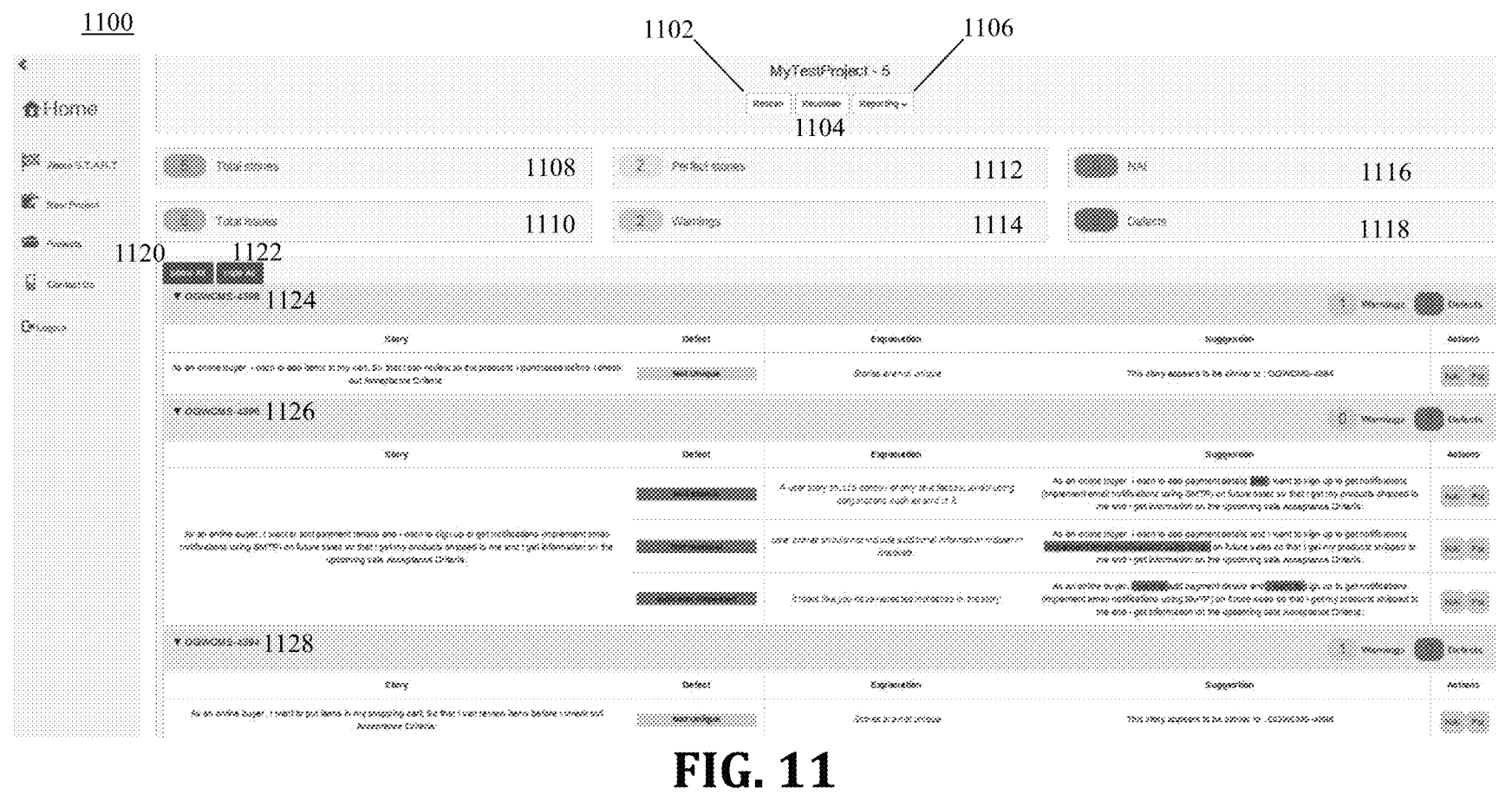

Referring to FIG. 11, an exemplary screenshot of a UI 1100 relating to a S.T.A.R.T. project that has had textual narratives added or uploaded is shown. In an exemplary embodiment, when a user adds or uploads textual narratives to the S.T.A.R.T. project (e.g., by clicking the submit button 1008 in the Upload via JIRA section 1002 of the UI 1000), the textual narratives added or uploaded may be scanned such that the textual narrative analysis module 302 determines a total number of textual narratives; a total number of issues; which textual narratives have issues; what the issues are (if any) for each textual narrative; a number of textual narratives added or uploaded that do not fail any quality criteria; which of the added or uploaded textual narratives (if any) that do not fail any quality criteria; a number of warnings, a number of defects, and a number of NAIs.

The UI 1100 may be a screenshot of a display presented to the user after the user has uploaded or added textual narrative(s). The UI 1100 may include a Rescan button 1102, a Reupload button 1104, and a Reporting button 1106. The Reupload button 1104 may direct the user to the UI 1000, which may provide the user with an ability to add, change, or delete, i.e., edit, the user stories included in the S.T.A.R.T. project.

The UI 1100 may include may include a Total stories section 1108, a Total issues section 1110, a Perfect stories section 1112, a Warnings section 1114, a Defects section 1118, and a Not An Issue (NAI) section 1116 that respectively indicate how many total stories, total issues, perfect stories, warnings, defects, and NAIs are included in the S.T.A.R.T. project. In contrast to UI 900, which is a screenshot of UI of the S.T.A.R.T. tool before any textual narratives were added to the S.T.A.R.T. project, UI 1100 is a screenshot of UI of the S.T.A.R.T. tool after textual narratives were added or uploaded to the S.T.A.R.T. project. As shown in FIG. 11, the Total stories section 908, Total issues section 910, Perfect stories section 912, Warnings section 914, Defects section 918, and NAI section 916 respectively indicate five total stories, five total issues, two perfect stories, two warnings, three Defects, and zero NAIs.

In an exemplary embodiment, the user may have an ability to click on one of the Total stories section 908, Total issues section 910, Perfect stories section 912, Warnings section 914, Defects section 918, and NAI section 916, which upon being clicked may respectively display all of the stories; all of the issues; all of the perfect stories, all of the warnings, all of the defects, and all of the NAIs in the S.T.A.R.T. project. The UI 1100 may further include a show all button 1120 and may include a hide all button 1122. The hide all button 1122 may hide all of the stories, issues, stories, warnings, defects, and NAIs, and the show all button 1120 may unhide the same.

As shown in FIG. 11, three user stories are shown, i.e., OGWCMS-4398, OGWCMS-4396, and OGWCMS-4394. For each user story shown, there is provided the language of the user story, a number of defects, a number of warnings, an identification of the defects/warnings, an explanation of the defect(s)/warning(s), a suggestion for improvement, and possible actions the user could take. In the exemplary embodiment shown, OGWCMS-4398 and OGWCMS-4394 have 1 warning, namely, that both violate the uniqueness quality criterion, and OGWCMS-4396 has three defects, namely, that OGWCMS-4396 is not atomic, not minimal, and has an indicator repeated.

Figure 12:
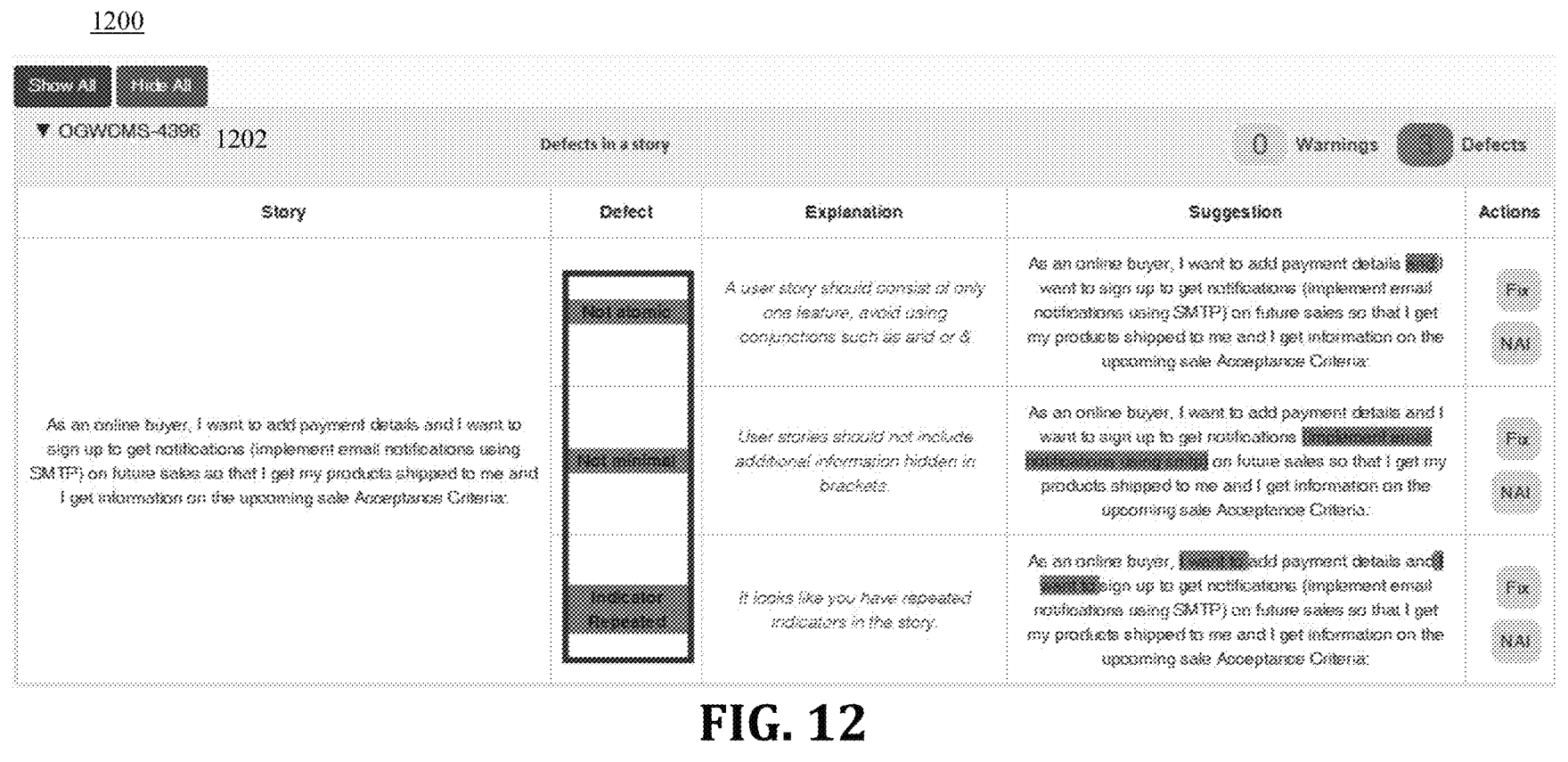

Referring to FIG. 12, an exemplary screenshot of a UI 1200 relating to a textual narratives having multiple defects, explanations of the defects, suggestions to mend the defects, and buttons or links to address the defect(s) is shown. In particular, a close up of the OGWCMS-4396 user story depicted in FIG. 11 is shown. In UI 1100, a user may be able to click, e.g., a defects button that relates to a specific user story 1202, and such click may direct the user to UI 1200 and/or a user may be directed to UI 1200 by clicking Defects 1118 of UI 1100.

Figure 13:
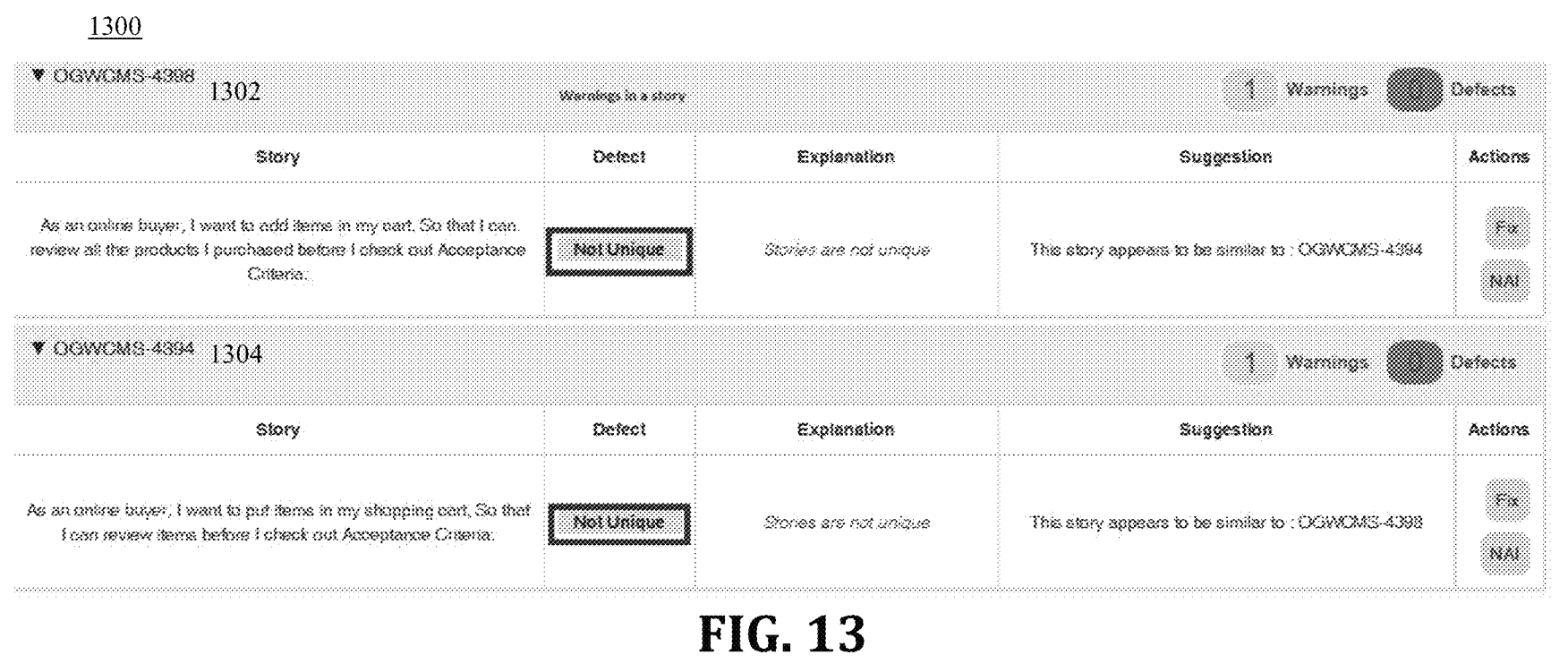

Referring to FIG. 13, an exemplary screenshot of a UI 1300 relating to two textual narratives which both have a corresponding warning that the textual narrative(s) are not unique, an explanation of the warning, and a suggestion to address the warning is shown. In UI 1100, a user may be able to click, e.g., a warnings button that relates to a specific user story 1302 or 1304, and such click may direct the user to UI 1300 and/or a user may be directed to UI 1300 by clicking Warnings 1114 of UI 1100.

Figure 14:
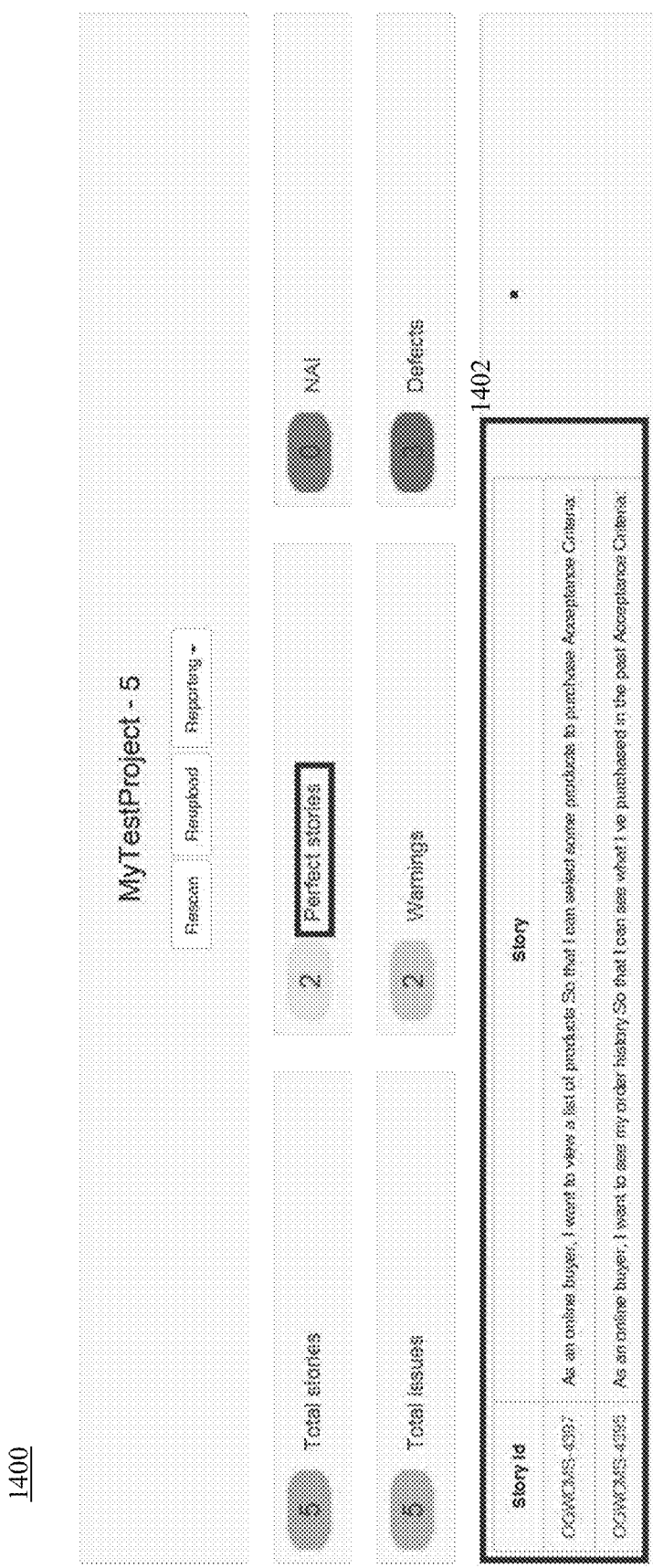
FIG. 14 shows an exemplary screenshot of a user interface relating to viewing textual narratives, which have no defects, of a particular project.

Referring to FIG. 14, an exemplary screenshot of a UI 1400 relating to viewing textual narratives which have no defects in a particular S.T.A.R.T. project is shown. A user may be directed to UI 1400, e.g., by clicking Perfect stories 1112 of UI 1100. As shown in FIG. 14, the exemplary S.T.A.R.T. project having title "MyTestProject-5" has two "perfect" user stories, i.e., two user stories that do not have corresponding defects or warnings.

Figure 15:
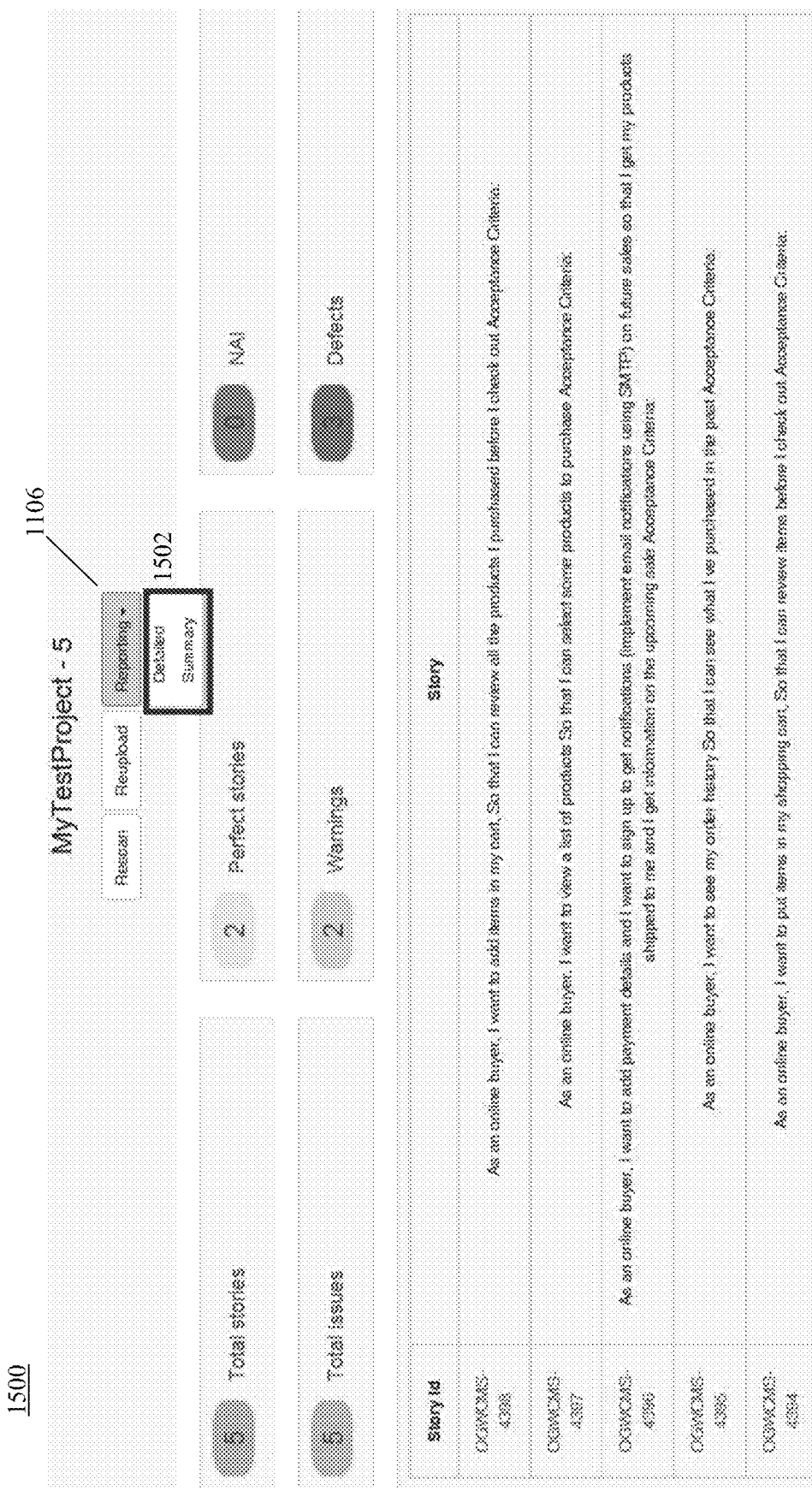
FIG. 15 shows an exemplary screenshot of a user interface including a dropdown menu to choose a reporting option.

Referring to FIG. 15, a user has an ability to click or select the Reporting button 1106. When a user clicks or selects the Reporting button 1106, there may be a dropdown menu 1502 which provides the user an option to either choose, e.g., a detailed report or a summary report.

Figure 16:
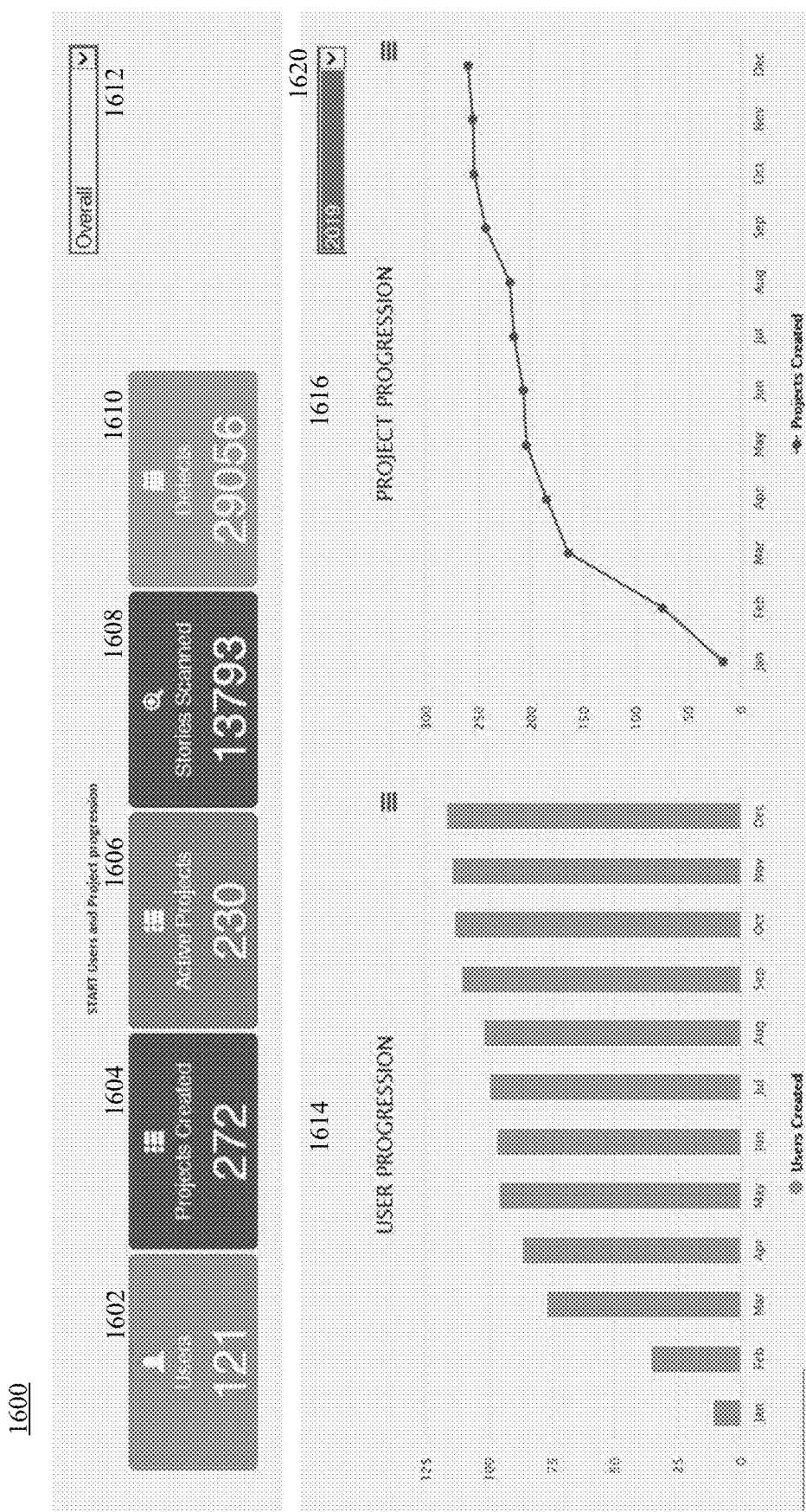
FIG. 16 shows an exemplary screenshot of a user interface including an output of reporting metrics for a particular project.

Referring to FIG. 16, an exemplary screenshot of a UI 1600 including an output of reporting metrics for a particular project is shown. The UI 1600 includes a users section 1602, a projects created section 1604, an active projects section 1606, a stories scanned section 1608, a defects section 1610, a narrowing dropdown 1612, a user progression graph 1614, a project progression graph 1616, and a year dropdown 1620. UI 1600 may be an exemplary summary report. A user may be directed to UI 1600 after choosing a detailed report from the dropdown menu 1502. In an exemplary embodiment, not all users of the S.T.A.R.T. tool have access to reporting features, and only a subset of users of the S.T.A.R.T. tool may run detailed and summary reports.

Accordingly, with this technology, an optimized process for analyzing a textual narrative e is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for analyzing a textual narrative, the method being implemented by at least one processor, the method comprising:

receiving, by the at least one processor from a user, an input that includes the textual narrative;

comparing, by the at least one processor, the textual narrative to at least one quality criterion;

determining, by the at least one processor based on the comparing, whether the textual narrative satisfies the at least one quality criterion;

providing an output that indicates a result of the determining;

transferring, by the at least one processor, the output to a structured query language (SQL) database;

retrieving, by the at least one processor via an object-relational mapping tool, the output from the SQL database;

displaying, via a graphical user interface (GUI), the retrieved output and suggested corrections to the textual narrative to satisfy at least one failed quality criterion, including an explanation of the at least one failed quality criterion and at least one possible action that the user could take to satisfy the at least one failed quality criterion;

receiving, via the GUI, the input and additional user input to edit the input to satisfy the at least one quality criterion; and further displaying, via the GUI, a total number of received textual narratives, a number of textual narratives that satisfy the at least one quality criterion, and a number of textual narratives that fail to satisfy the at least one quality criterion, wherein the comparing is performed by using at least one Natural Language Processing (NLP) technique which applies artificial intelligence (AI) to scan the input to recognize words, analyze language of the textual narrative based on the recognized words, and compare the language of the textual narrative to the at least one quality criterion, wherein the at least one quality criterion includes at least one from among a semantic criterion and a syntactical criterion, wherein the semantic criterion relates to a conceptual soundness of the textual narrative and requires that the textual narrative includes a rationalization of a means for which the textual narrative aims to achieve, and wherein the syntactical criterion relates to a syntax of the textual narrative and includes at least one from among a requirement of being well-formed, a requirement of being atomic, and a requirement of being minimal.

2. The method according to claim 1,
wherein the textual narrative includes at least one from among a user story that relates to a feature of a software product and an epic that relates to a plurality of features of a software product.

3. The method according to claim 1, wherein the semantic criterion includes at least one from among a requirement of being problem oriented, which requires that the textual narrative is limited to language which addresses a particular problem, a requirement of being unambiguous, which requires that the textual narrative is substantially distinct as compared to other textual narratives, and a requirement of being in a full sentence, which requires that the textual narrative is a complete sentence, all words in the textual narrative are spelled correctly, and the textual narrative lacks grammatical errors.

4. The method according to claim 1,
wherein the at least one quality criterion includes a pragmatic criterion that relates to a subjective interpretation of the textual narrative to an audience, and
wherein the pragmatic criterion includes at least one from among a requirement of being estimable, a requirement of being unique, a requirement of being conflict-free, a requirement of being uniform, a requirement of being independent, and a requirement of being complete.

5. The method according to claim 4, further comprising:
retrieving, by the at least one processor from a memory, another textual narrative; and
comparing, by the at least one processor, the textual narrative to the another textual narrative,
wherein when a result of the comparing of the textual narrative to the another textual narrative is that a match percentage exceeds a predetermined match percentage threshold, a determination is made that the requirement of being unique is violated.

6. The method according to claim 3,
wherein the requirement of being problem oriented includes providing a description of a potential problem while avoiding prescribing a proposed solution to the potential problem.

7. A computing apparatus for analyzing a textual narrative, the computing apparatus comprising:
at least one processor;
a memory;
a display; and
a communication interface coupled to each of the at least one processor and the memory, wherein the at least one processor is configured to:
receive, by the at least one processor from a user, an input that includes the textual narrative;
compare, by the at least one processor, the textual narrative to at least one quality criterion;
determine, by the at least one processor based on the comparing, whether the textual narrative satisfies the at least one quality criterion;
provide an output that indicates a result of the determining;
transfer, by the at least one processor, the output to a structured query language (SQL) database;
retrieve, by the at least one processor via an object-relational mapping tool, the output from the SQL database;
display, on the display via a graphical user interface (GUI), the retrieved output and suggested corrections to the textual narrative to satisfy a failed quality criterion, including an explanation of the at least one failed quality criterion and at least one possible action that the user could take to satisfy the at least one failed quality criterion;
receive, via the GUI, the input and additional user input to edit the input to satisfy the at least one quality criterion; and
further display, via the GUI, a total number of received textual narratives, a number of textual narratives that satisfy the at least one quality criterion, and a number of textual narratives that fail to satisfy the at least one quality criterion,
wherein the comparing is performed by using at least one Natural Language Processing (NLP) technique which applies artificial intelligence (AI) to scan the input to recognize words, analyze language of the textual narrative based on the recognized words, and compare the language of the textual narrative to the at least one quality criterion,
wherein the at least one quality criterion includes at least one from among a semantic criterion and a syntactical criterion,
wherein the semantic criterion relates to a conceptual soundness of the textual narrative and requires that the textual narrative includes a rationalization of a means for which the textual narrative aims to achieve, and
wherein the syntactical criterion relates to a syntax of the textual narrative and includes at least one from among a requirement of being well-formed, a requirement of being atomic, and a requirement of being minimal.

8. The computing apparatus according to claim 7,
wherein the textual narrative includes at least one from among a user story that relates to a feature of a software product and an epic that relates to a plurality of features of a software product.

9. The computing apparatus according to claim 7, wherein the semantic criterion includes at least one from among a requirement of being problem oriented, which requires that the textual narrative is limited to language which addresses a particular problem, a requirement of being unambiguous, which requires that the textual narrative is substantially distinct as compared to other textual narratives, and a requirement of being in a full sentence, which requires that the textual narrative is a complete sentence, all words in the textual narrative are spelled correctly, and the textual narrative lacks grammatical errors.

10. The computing apparatus according to claim 7,
wherein the at least one quality criterion includes a pragmatic criterion that relates to a subjective interpretation of the textual narrative to an audience, and
wherein the pragmatic criterion includes at least one from among a requirement of being estimable, a requirement of being unique, a requirement of being conflict-free, a requirement of being uniform, a requirement of being independent, and a requirement of being complete.

11. The computing apparatus according to claim 10, wherein the at least one processor is further configured to:
retrieve from the memory another textual narrative; and
compare the textual narrative to the another textual narrative,
wherein when a result of the comparing of the textual narrative to the another textual narrative is that a match percentage exceeds a predetermined match percentage threshold, a determination is made that the requirement of being unique is violated.

12. The computing apparatus according to claim 9, wherein the requirement of being problem oriented includes providing a description of a potential problem while avoiding prescribing a proposed solution to the potential problem.

13. A non-transitory computer readable storage medium storing instructions for analyzing a textual narrative, the storage medium comprising executable code which, when executed by at least one processor, causes the at least one processor to:
receive, by the at least one processor from a user, an input that includes the textual narrative;
compare, by the at least one processor, the textual narrative to at least one quality criterion;
determine, by the at least one processor based on the comparing, whether the textual narrative satisfies the at least one quality criterion;
provide an output that indicates a result of the determining;
transfer, by the at least one processor, the output to a structured query language (SQL) database;
retrieve, by the at least one processor via an object-relational mapping tool, the output from the SQL database;
display, via a graphical user interface (GUI), the retrieved output and suggested corrections to the textual narrative to satisfy a failed quality criterion, including an explanation of the at least one failed quality criterion and at least one possible action that the user could take to satisfy the at least one failed quality criterion;
receive, via the GUI, the input and additional user input to edit the input to satisfy the at least one quality criterion; and
further display, via the GUI, a total number of received textual narratives, a number of textual narratives that satisfy the at least one quality criterion, and a number of textual narratives that fail to satisfy the at least one quality criterion,
wherein the comparing is performed by using at least one Natural Language Processing (NLP) technique which applies artificial intelligence (AI) to scan the input to recognize words, analyze language of the textual narrative based on the recognized words, and compare the language of the textual narrative to the at least one quality criterion,
wherein the at least one quality criterion includes at least one from among a semantic criterion and a syntactical criterion,
wherein the semantic criterion relates to a conceptual soundness of the textual narrative and requires that the textual narrative includes a rationalization of a means for which the textual narrative aims to achieve, and
wherein the syntactical criterion relates to a syntax of the textual narrative and includes at least one from among a requirement of being well-formed, a requirement of being atomic, and a requirement of being minimal.

14. The method according to claim 1, wherein the GUI further comprises at least one from among a button and a link to address the failed quality criterion based on the suggested corrections.

15. The computing apparatus according to claim 7, wherein the GUI further comprises at least one from among a button and a link to address the failed quality criterion based on the suggested corrections.

* * * * *